Jan. 14, 1969 N. GOTTLIEB 3,421,808
MICROSCOPE ILLUMINATING SYSTEM
Filed Feb. 19, 1964
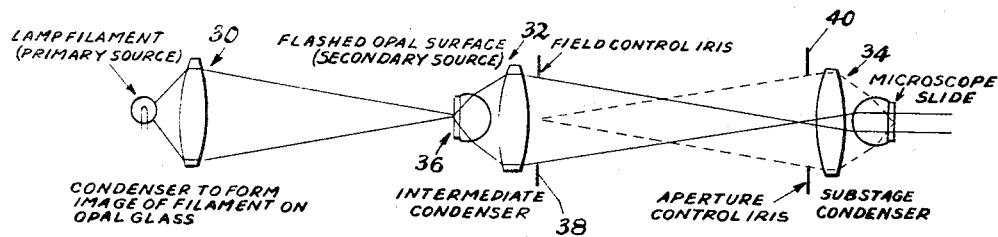
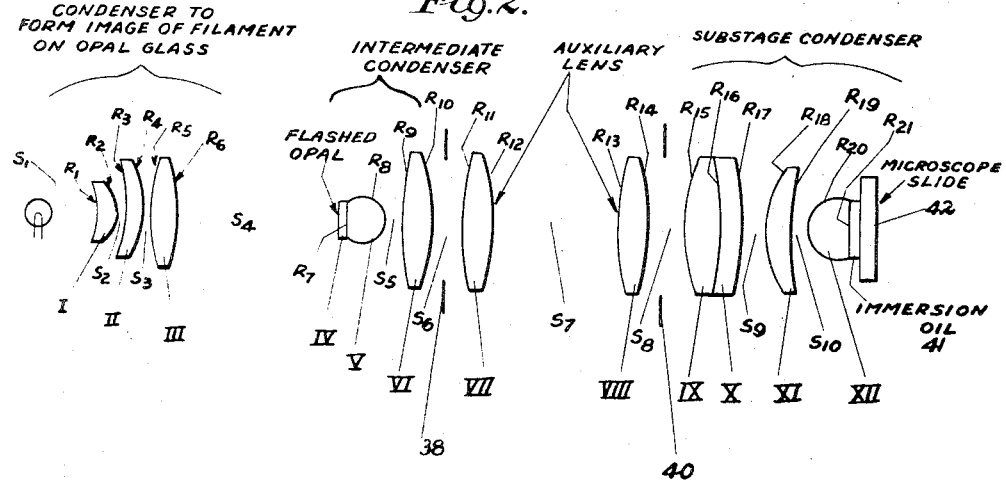
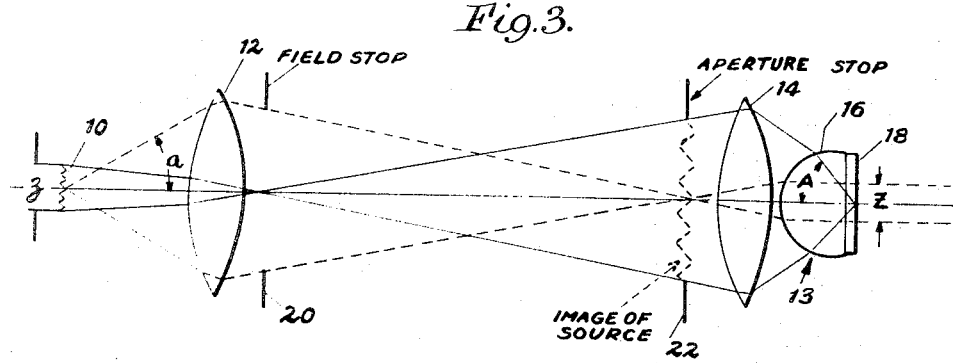
INVENTOR.
NATHAN GOTTLIEB
BY
Bean, Brooks, Buckley + Bean
ATTORNEYS 3,421,808
MICROSCOPE ILLUMINATING SYSTEM
Nathan Gottlieb, Buffalo, N.Y., assignor to American
  Optical Company, Southbridge, Mass.
Filed Feb. 19, 1964, Ser. No. 345,907
U.S. Cl. 350—87                               9 Claims
Int. Cl. G02b 21/06

ABSTRACT OF THE DISCLOSURE

In a microscope illuminating system providing Köhler illumination, the problem of filling the fields and matching the numerical apertures for different microscope objectives is met by imaging the light source at the front surface of a secondary condenser whereat light scattering is provided. In this way, the necessity for movable or replaceable lens elements to accommodate for the various objectives is eliminated.

---

This invention relates to an illuminating system for microscopes and is concerned more particularly with an illuminating system which provides true Köhler illumination for a variety of objectives.

Normally, the illuminating system for the stage of microscopes consists of some self luminous source such as the filament of a lamp, carbon arc, etc., and a system of lenses to form an image of the self luminous source. There are two basic types of microscope illumination, namely Köhler illumination, and so called "critical" illumination, which differ principally in the location of the image of the source with respect to the microscope. The present invention concerns itself with the illumination of microscope stages in which Köhler illumination is obtained for all objectives. Regardless of the type of illumination, the illuminating system must fill the field of view of the microscope, it must provide light bundles of sufficiently large numerical aperture to match the numerical aperture of the microscope objective and it must provide separate means to vary the field and the numerical aperture independently of one another when the required field or numerical aperture changes with a change from one microscope objective to another. Since the ranges of numerical aperture and field diameter are relatively great for the types of objectives which would be used, it has been necessary up to now to resort to either alternatively usable lenses or to movable lenses for accommodating the range of numerical apertures and field diameters involved. As an alternative, some systems simply deviate from true Köhler illumination to provide a compromise for all the objectives involved. As may be imagined, movable or removable lens systems for illumination are expensive and involve problems of both mechanical and an optical nature end, of course, those systems which deviate from true Köhler illumination are to be avoided if possible. It is, accordingly, an object of the present invention to provide a microscope illumination system which does not require the use of either movable or removable lenses and which, at the same time, will provide true Köhler illumination over a wide range of both numerical aperture and field diameter. Thus, according to the present invention, an illuminating system for microscopes is provided in which true Köhler illumination is provided for a variety of objectives, the field for all objectives is covered, and the numerical aperture of all objectives is also filled.

More specifically, it is an object of this invention to provide an illuminating system as aforesaid in which primary and secondary light sources are provided, the former of which may be established by an ordinary illuminating bulb and the second of which is provided for by imaging the primary light source upon light scattering means which may be either at or formed on the first surface of an intermediate condenser system. In this fashion, an image of the secondary light source may be made to appear at the substage condenser aperture control iris diaphragm, and the field control iris diaphragm at the intermediate condenser may be focused at the microscope stage by the substage condenser. Thus, true Köhler illumination may be provided by suitable adjustment of field diameter and numerical aperture to accommodate for several objectives ranging between large values of numerical aperture with small fields and small values of numerical aperture with large fields.

Other objects and advantages of the invention will appear from the description hereinbelow and the accompanying drawing wherein:

FIG. 1 is a diagrammatic view of an optical system embodying the principles of the present invention;

FIG. 2 is a view of a preferred embodiment of the present invention; and

FIG. 3 is a view of a conventional illuminating system.

FIG. 3 illustrates a simplified system to provide for Köhler illumination and, as shown therein, is provided with a light source 10, a source condenser 12, a substage condenser 13 including the lens element 14 and 16 for illuminating an object placed on the microscope slide 18. Additionally, there are provided two adjustable stops 20 and 22 for controlling the size of the field Z and the numerical aperture A. The system is constructed so that the source condenser 12 images the source 10 at the focal plane of the substage condenser 13 and it will be noted that the aperture stop 22 is located at or near such focal plane so that when adjusted to maximum, the maximum numerical aperture A will be established. Similarly, the field stop 20 is shown in FIG. 3 as adjusted to maximum to establish the maximum field diameter Z, at the microscope slide 18. From FIG. 3 it will be apparent that the field diameter cam be adjusted by the stop 20 from zero to the maximum Z and that the numerical aperture can be adjusted from zero to the maximum A by manipulation of the aperture stop 22. It will further be apparent that these adjustments are independent of each other, so that changes in numerical aperture can be made without affecting the field diameter, and changes in field diameter can be made without affecting the numerical aperture.

Although the system of FIG. 3 illustrates the principles of true Köhler illumination there is no indication in FIG. 3 of the practical limits as to the ranges of numerical aperture and field diameter which can be accommodated. These limits can be made clear by considering the properties of the following conventional microscope objectives.

| Objectives | Field Diameter (mm.) | Numerical Aperture |
| --- | --- | --- |
| 100× (oil imm.) | 0.2 | 1.30 |
| 43× | 0.47 | 0.65 |
| 10× | 2.00 | 0.25 |
| 4× | 5.00 | 0.12 |

From the foregoing table it will be apparent that the illuminating system must be capable of filling a numerical aperture at least as high as 1.30, for the 100× objective, and at the same time, the illuminating system must be capable of covering a field of at least 5.00 mm., for the 4× objective. Thus, when the 100× microscope objective is in use the maximum numerical aperture must be available, while the field diameter may be reduced from 5.00 mm. diameter to the required 0.2 mm. diameter by closing stop 20 in FIG. 3 by the necessary amount. Similarly, when the 4× microscope objective is in use the maximum field diameter must be available, while the numerical aperture may be reduced from NA 1.30 to the required NA 0.12 by closing stop 22 in FIG. 3 by the necessary amount.

Particular note should be taken of the fact that in the foregoing no changes in the source, source condenser or substage condenser are required, and no lenses are moved, removed, or added in order to accomplish the purpose described, the only adjustments involved being those of the field stop (20 in FIG. 3) and the aperture stop (22 in FIG. 3).

The present invention is designed to fulfill all the requirements in the foregoing discussion of the principles involved in the system illustrated in FIG. 3, and no illuminating system of the prior art operates according to the aforementioned principles. Referring again to FIG. 3, it is easy to show that $$AZ = az$$

where $A$ = Maximum numerical aperture of the substage condenser
$Z$ = Maximum field diameter
$a$ = Numerical aperture of the source condenser
$z$ = Diameter of the light source.

Referring again to the table of conventional microscope objectives we find that $A = 1.30$ (for the 100× objective)
$Z = 5.00$ mm. (for the 4× objective)

so that for the illuminating system $AZ = 6.50 = az$

Thus, the product of $z$, the source diameter (in mm.) and $a$, the source condenser numerical aperture is required to have a value of 6.50. Because this product has such a large value, it becomes practically impossible to find suitable source and source condenser combinations, except by the method taught in the present invention. The difficulties can be made clear in the following:

(1) If the source diameter is 6.50 mm. or smaller, then the source condenser must have a numerical aperture of 1.0 or greater. As is well known in the art, a numerical aperture of 1.0 or greater for the source condenser can only be obtained if the index of refraction of the medium surrounding the source is greater than unity, which means that the incandescent source must be embedded in some liquid or solid optical material.

(2) A reasonable maximum value for the numerical aperture of the source condenser is .65; but then the source diameter must be at least 10.0 mm. Sources of such a size are available, but lamps with such large filaments are of very high power, totally unsuited to microscope illumination. Moreover, the other lamp dimensions are correspondingly large, and this in turn requires the source condenser dimensions to be very large. Such a system becomes impractical for ordinary microscope illumination, and it is clearly impossible to consider enclosing such an illumination system in the base of a microscope, to provide "built-in" illumination.

To overcome the difficulties mentioned, aside from simply departing from Köhler illumination, the focal length of the substage condenser may be varied by means of removable or movable lenses to obtain the requisite values, or the magnification of the lamp condenser may be varied by implementing a variable magnification relay stage between the source condenser and the substage condenser.

However, such solutions are in general undesirable due to the mechanical and/or optical difficulties attendant thereto. Accordingly, as shown in FIG. 1, the present invention basically employs a primary condenser 30, an intermediate condenser 32, and a substage condenser 34 in which light scattering means 36 are positioned at or on the first surface of the secondary condenser 32.

Considering a cone of light in air focused on the scattering means 36, although the numerical aperture of the cone in air must always be less than unity, when scattering takes place and the light travels thereafter in material whose index of refraction is greater than unity, the numerical aperture of the cone is increased. Thus, by having the scattering means 36 at or on the first surface of the intermediate condenser 32, in any case devoid of air separation therefrom, the numerical aperture ($a$ in the above equation) of the intermediate condenser 32 relative to the secondary light source may be greater than unity. Further, since the primary condenser 30 may be made to provide the image at the light scattering means 36 at suitable magnification, the value $z$ in the above equation is readily increased. In this fashion, the product $az$ as aforesaid may be materially increased without resorting to abnormally or unrealistically large filament diameter of the light source 10. It is therefore possible to satisfy the condition $$az = AZ$$

and, moreover, it is further possible to accomplish this by making the symmetrical arrangement $$a = A$$

and $$z = Z$$

Although it will be appreciated that departures from symmetry in both field and numerical aperture between the intermediate condenser 32 and the substage condenser 34 may be desirable and practical without departing from the spirit of the invention.

Thus, referring again to FIG. 1 and to the aforementioned conventional objectives, it will be appreciated that if the numerical aperture of the substage condenser 34 is made equal to 1.30 and the numerical aperture of the intermediate condenser is also made equal to 1.30, and by using a suitable scattering means 36, the diameter $z$ of the secondary source of illumination need only be 5 mm. diameter (the requisite value of $z = 5.0$ is easily obtained with a source 10 of considerably lesser dimensions due to the magnification effected by the primary condenser 30) to satisfy all of the aforesaid conventional objectives, since in this case $A = 1.30$, $a = 1.30$ and $z = 5.0$ so that $$Z = \frac{az}{A} = \frac{1.30 \times 5}{1.30} = 5.0 \text{ mm.}$$

By using the field and aperture control iris members as shown in FIG. 1, true Köhler illumination may be obtained for all of the objectives listed.

By way of specific example, having reference to FIG. 2, the following data are noted in which $Nd$ is the index of refraction for the D line of sodium, $v$ is the reciprocal dispersion of the optical material, and all linear dimensions are in millimeters:

| Element | Index of Refraction | $v$ | Radii | Thickness | Distance |
|---|---|---|---|---|---|
| I | 1.523 | 58.5 | $R_1 = -20.605$ | 4.60 | $S_1 = 8.08$ |
|   |       |      | $R_2 = -9.070$  |      | $S_2 = .09$ |
| II | 1.523 | 58.5 | $R_3 = -131.398$ | 4.75 | |
|    |       |      | $R_4 = -17.667$  |      | $S_3 = .270$ |
| III | 1.523 | 58.5 | $R_5 = 31.935$ | 4.75 | |
|     |       |      | $R_6 = -46.484$ |     | $S_4 = 67.45$ |
| IV | Flashed Opal | | $R_7 = \infty$ | 1.40 | |
| V | 1.617 | 36.6 | $R_8 = -8.00$ | 11.87 | $S_5 = .40$ |
| VI | 1.523 | 58.5 | $R_9 = 116.2$ | 8.32 | |
|    |       |      | $R_{10} = -19.81$ | | $S_6 = 4.00$ |
| VII | 1.517 | 64.5 | $R_{11} = 34.042$ | 5.35 | |
|     |       |      | $R_{12} = -200.868$ | | $S_7 = 48.085$ |
| VIII | 1.517 | 64.5 | $R_{13} = 200.868$ | 5.35 | |
|      |       |      | $R_{14} = -34.042$ | | $S_8 = 4.00$ |
| IX | 1.517 | 64.5 | $R_{15} = 24.591$ | 10.50 | |
|    |       |      | $R_{16} = -22.419$ | | |
| X | 1.7845 | 25.7 | $R_{17} = -69.618$ | 1.50 | $S_9 = .10$ |
| XI | 1.517 | 64.5 | $R_{18} = 12.144$ | 5.80 | |
|    |       |      | $R_{19} = 24.444$ | | $S_{10} = .10$ |
| XII | 1.517 | 64.5 | $R_{20} = 6.293$ | 8.50 | |
|     |       |      | $R_{21} = \infty$ | | Oil 41 = .30 |
|     |       |      |                    | | Slide 42 = 1.250 |

The stops 38 and 40 are equidistantly spaced between lenses VI and VII and lenses VIII and IX. Further, it will be noted that in addition to the primary or source condenser (lenses I, II and III), the secondary or intermediate condenser (lenses IV, V and VI) and the substage condenser (lenses IX, X, XI and XII), the auxiliary lens assembly consisting of the two lenses VII and VIII is provided between the secondary and substage condensers. The purpose of the auxiliary lens assembly is to focus at the aperture stop light from the secondary source which has been collimated by the intermediate condenser, and simultaneously to collimate light from the field stop before it enters the substage condenser; but it will be understood that this collimation is not essential and that the auxiliary lens assembly may be dispensed with by accommodating for such elimination in the remainder of the system.

In the specific example, the system is optically corrected so that the image of the scattering surface or secondary source is formed without harmful aberration in the plane of the aperture control iris 40 and so that the image of the field control iris 38 is formed without harmful aberration at the microscope slide.

It is to be understood that certain changes and modifications as illustrated and described may be made without departing from the spirit of the invention or the scope of the following claims.

I claim:

1. An illuminating system for microscopes, characterized by the ability of the system to cover the fields and to fill the numeral apertures of different objectives while providing Köhler illumination for each, comprising:
    a series of optically aligned and relatively fixed lens members presentinb a primary condenser, a secondary condenser and a substage condenser,
    a light source adjacent said primary condenser, said lens members being of such power and so spaced as to image said light source substantially at the first surface of said secondary condenser,
    light scattering means at said first surface of said secondary condenser to provide a secondary light source whereby the numerical aperture of the secondary condenser relative to the secondary light source may be greater than unity, the powers and spacing of said lens members being such as to image said secondary light source substantially at the focal plane of said substage condenser,
    and adjustable stop means located between said secondary and substage condensers for controlling the numerical aperture and field diameter of the illuminating rays emanating from said substage condenser.

2. An illuminating system for microscopes, characterized by the ability of the system to cover the fields and to fill the numerical apertures of different objectives while providing Köhler illumination for each objective, said system including:
    a condenser having light scattering means at its front surface,
    a substage condenser spaced from the first mentioned condenser,
    and means providing a light source at said light scattering means.

3. A microscope illuminating system comprising:
    a primary condenser, a secondary condenser and a substage condenser all optically aligned and disposed in spaced relation,
    said secondary condenser having light scattering means at the first surface thereof facing said primary condenser,
    a light source adjacent said primary condenser and the spacing between said light source and the primary condenser and the spacing between the primary and secondary condensers being such as to image the source at said scattering means to provide a secondary light source thereat,
    an adjustable field control stop adjacent the last surface of said secondary condenser,
    an adjustable aperture control stop adjacent the focal plane of said substage condenser,
    and the spacing between said secondary and substage condensers being such as to image the secondary source substantially at the focal plane of said substage condenser.

4. In an illuminating system for microscopes, characterized by the ability of the system to cover the fields and to fill the numerical apertures of different objectives while providing Köhler illumination for each, comprising:
    a series of optically aligned and relatively fixed lens members presenting a secondary condenser and a substage condenser,
    a light source, light scattering means at the first surface of said secondary condenser to provide a secondary light source, the powers and spacing of said lens members being such as to image said secondary light source at the focal plane of said substage condenser,
    an adjustable stop means located between said secondary and substage condensers for controlling the numerical aperture and field diameter of the illuminating rays emanating from said substage condenser.

5. An illuminating system for multiple-objective microscopes characterized by adjustability to cover the fields and to fill the numerical apertures of different objectives while providing Köhler illumination for each objective, including:
- a condenser having light scattering means at its front surface,
- a substage condenser spaced from the first mentioned condenser,
- and means for forming a light source image on said light scattering means.

6. A microscope illuminating system comprising:
- a primary condenser, a secondary condenser and a substage condenser all optically aligned and disposed in spaced relation,
- said secondary condenser having light scattering means at the first surface thereof facing said primary condenser,
- a light source adjacent said primary condenser,
- an adjustable field control stop adjacent the last surface of said secondary condenser,
- and an adjustable aperture control stop adjacent said substage condenser.

7. An illuminating system for multiple-objective microscopes characterized by adjustability to cover the fields and to fill the numerical apertures of different objectives while providing Köhler illumination for each, comprising:
- a series of optically aligned and relatively fixed lens members presenting a primary condenser, a secondary condenser and a substage condenser,
- a light source adjacent said primary condenser,
- light scattering means at said first surface of said secondary condenser to provide a secondary light source,
- an adjustable stop means located between said secondary and substage condensers for controlling the numerical aperture and field diameter of the illuminating rays emanating from said substage condenser.

8. In an illuminating system for microscopes, characterized by the ability of the system to cover the fields and to fill the numerical apertures of different objectives, comprising:
- a light source,
- a condenser having light scattering means at its first surface facing said light source,
- means for forming a magnified image of said light source at said light scattering means,
- an adjustable stop means for controlling the numerical aperture and field diameter of illuminating rays emanating from said system.

9. The system according to claim 1 wherein a collimating auxiliary lens asembly is provided between said secondary and substage condensers, said primary condenser consisting of lenses I, II and III, said secondary condenser consisting of lenses IV, V and VI, said auxiliary lens assembly consisting of lenses VII and VIII, and said substage condenser consisting of lenses IX, X, XI and XII, all according to the following in which $n_D$ is the index of refraction for the D line of sodium, $v$ is the reciprocal dispersion of the optical material, and all linear dimenesions are in millimeters:

| Element | Index of Refraction | $v$ | Radii | Thickness | Distance |
|---|---|---|---|---|---|
| I | 1.523 | 58.5 | $R_1 = -20.605$ | 4.60 | $S_1 = 8.08$ |
|   |       |      | $R_2 = -9.070$  |      | $S_2 = .09$ |
| II | 1.523 | 58.5 | $R_3 = -131.398$ | 4.75 |  |
|    |       |      | $R_4 = -17.667$  |      | $S_3 = .270$ |
| III | 1.523 | 58.5 | $R_5 = 31.935$ | 4.75 |  |
|     |       |      | $R_6 = -46.484$ |      | $S_4 = 67.45$ |
| IV | Flashed Opal | | $R_7 = \infty$ | 1.40 | |
| V | 1.617 | 36.6 | $R_8 = -8.00$ | 11.87 | |
|   |       |      | $R_9 = 116.2$ |       | $S_5 = .40$ |
| VI | 1.523 | 58.5 | $R_{10} = -19.81$ | 8.32 | |
|    |       |      | $R_{11} = 34.042$ |       | $S_6 = 4.00$ |
| VII | 1.517 | 64.5 | $R_{12} = -200.868$ | 5.35 | |
|     |       |      | $R_{13} = 200.868$ |       | $S_7 = 48.085$ |
| VIII | 1.517 | 64.5 | $R_{14} = -34.042$ | 5.35 | |
|      |       |      | $R_{15} = 24.591$ |       | $S_8 = 4.00$ |
| IX | 1.517 | 64.5 | $R_{16} = -22.419$ | 10.50 | |
|    |       |      | $R_{16} = -22.419$ |       |  |
| X | 1.7845 | 25.7 | $R_{17} = -69.618$ | 1.50 | |
|   |        |      | $R_{18} = 12.144$  |      | $S_9 = .10$ |
| XI | 1.517 | 64.5 | $R_{19} = 24.444$ | 5.80 | |
|    |       |      | $R_{20} = 6.293$  |      | $S_{10} = .10$ |
| XII | 1.517 | 64.5 | $R_{21} = \infty$ | 8.50 | |
|     |       |      |                   |      | Oil 41 = .30 |
|     |       |      |                   |      | Slide 42 = 1.250 |

References Cited

UNITED STATES PATENTS

2,275,602  3/1942  Beck et al.
2,351,736  6/1940  Benford _____ 350—87
2,732,759  1/1956  Osterbeg _____ 350—13

OTHER REFERENCES

"Mikrophotographische Aufnahmen mit Rohrenblitzgeraten," Photo-Technik und-Wirtschaft, vol. 5, No. 10, pp. 478–479, October 1954.

DAVID SCHONBERG, *Primary Examiner.*

PAUL R. MILLER, *Assistant Examiner.*

U.S. Cl. X.R.

350—17, 86, 169, 181, 235